May 10, 1932.  W. E. RICHTER  1,857,517
METHOD OF RESISTANCE WELDING AUTOMOTIVE VEHICLE FRAMES
Filed June 11, 1928  2 Sheets-Sheet 1
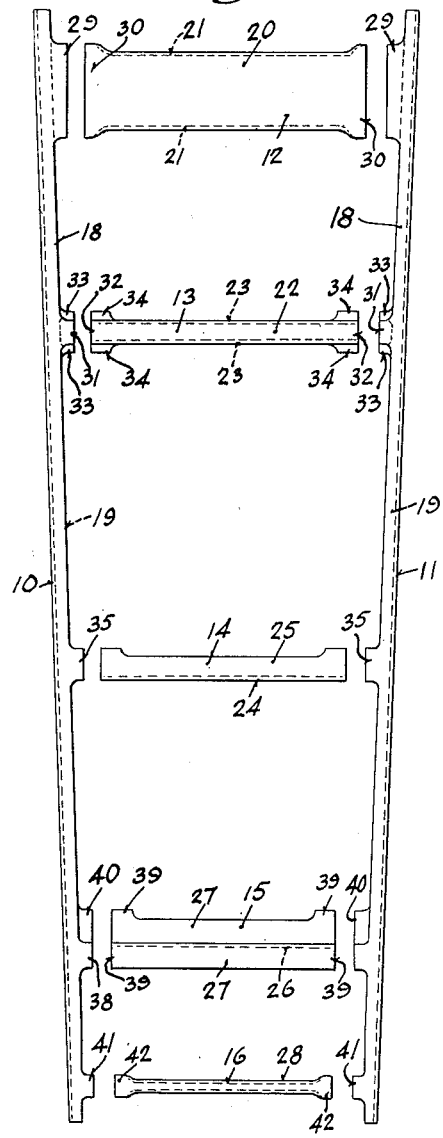
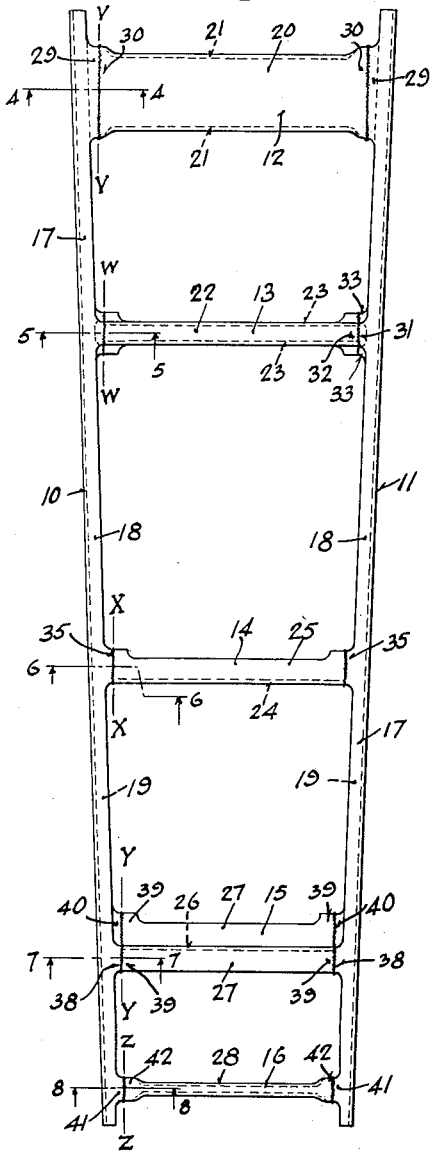
INVENTOR.
WALTER E. RICHTER
BY
ATTORNEY.

May 10, 1932. W. E. RICHTER 1,857,517
METHOD OF RESISTANCE WELDING AUTOMOTIVE VEHICLE FRAMES
Filed June 11, 1928 2 Sheets-Sheet 2
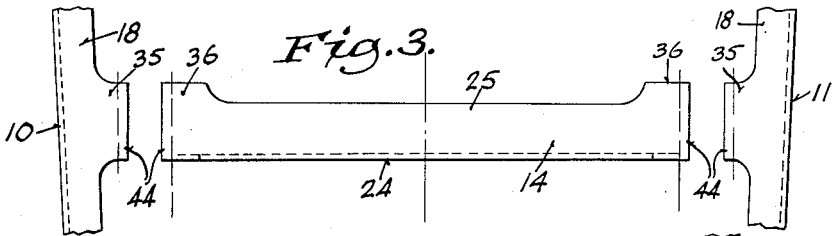
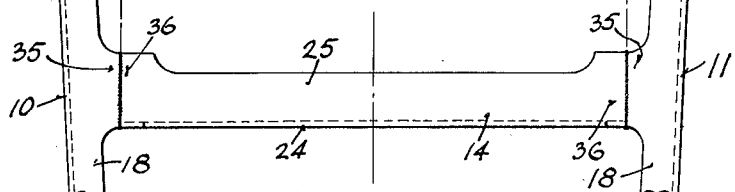
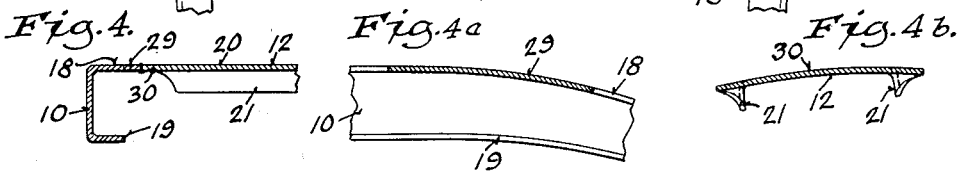
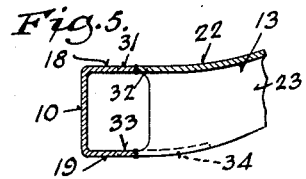 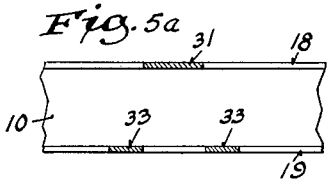 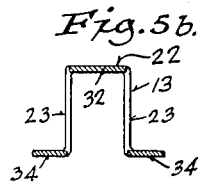
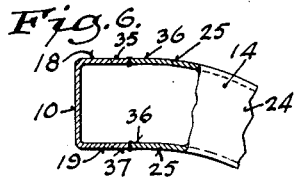 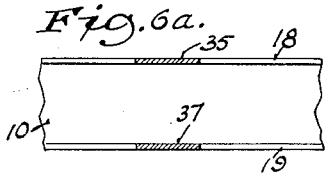 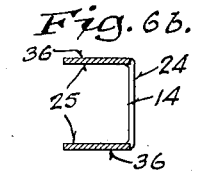
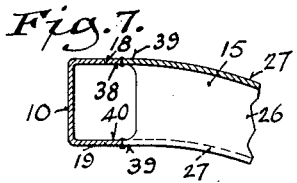 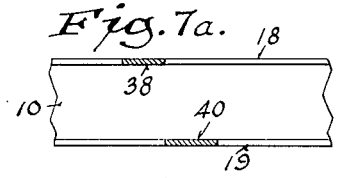 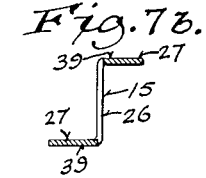
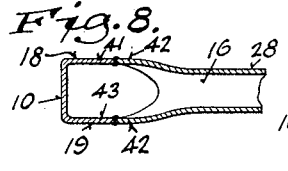 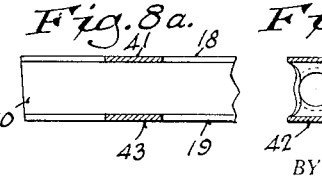 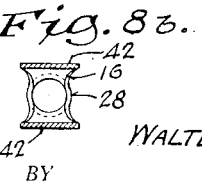
INVENTOR.
WALTER E. RICHTER
BY
ATTORNEY.

Patented May 10, 1932

1,857,517

UNITED STATES PATENT OFFICE

WALTER E. RICHTER, OF MILWAUKEE, WISCONSIN, ASSIGNOR TO A. O. SMITH CORPORATION, OF MILWAUKEE, WISCONSIN, A CORPORATION OF NEW YORK

METHOD OF RESISTANCE WELDING AUTOMOTIVE VEHICLE FRAMES

Application filed June 11, 1928. Serial No. 284,646.

Automotive vehicle frames are now ordinarily constructed of two sheet metal members pressed into the shape of channels to form longitudinally extending side bars, the latter being united by a plurality of transversely extending cross members or bars the ends of which are rigidly attached to the side bars to constitute a permanent structure. The cross bars are formed in a variety of different cross-sectional shapes, some being pressed steel channel members, some being pressed steel members of other preferred cross-sectional configuration, and still others being steel members of tubular formation. Usually, the cross bars are attached to the side bars by means of flanges at the ends of the cross bars and riveted to the side bars.

The present invention resides in the provision of an automotive vehicle frame consisting of longitudinal or side members and transverse or cross members of the general character as stated, and wherein the longitudinal or side members and the transverse or cross members are integrally joined into a unitary structure, constituting the automotive vehicle frame, by resistance-welding methods, the union between the transverse or cross members and the said longitudinal or side members preferably being accomplished by butt-welding.

The general nature of my invention having been thus briefly stated, I shall now proceed to particularly describe the same, and shall later specifically point out the novel features and characteristics of the invention in claims appended to this specification.

Fig. 1 is a plan view of disassembled longitudinal or side bars and transverse or cross bars adapted to be connected together in accordance with the principles of my novel method to produce the improved automotive vehicle frame of the present invention.

Fig. 2 is a plan view of the automotive vehicle frame resulting from assembly and connection with each other of the longitudinal or side bars and the transverse or cross bars of Fig. 1.

Fig. 3 is an enlarged plan view of one of the transverse or cross bars of Fig. 1 and portions of the longitudinal or side bars to be connected therewith, the present figure also disclosing a fragment of the frame of Fig. 2 constituted by the mentioned transverse or cross bar and the said portions of the longitudinal or side bars after their attachment to the said transverse or cross bar.

Fig. 4 is an enlarged sectional view on line 4—4 in Fig. 2, looking in the direction of the arrows.

Fig. 4a is an enlarged sectional view on line V—V in Fig. 2, looking toward the left.

Fig. 4b is an enlarged sectional view on the said line V—V in Fig. 2, looking toward the right.

Fig. 5 is an enlarged sectional view on line 5—5 in Fig. 2, looking in the direction of the arrows.

Fig. 5a is an enlarged sectional view on line W—W in Fig. 2, looking toward the left.

Fig. 5b is an enlarged sectional view on the said line W—W in Fig. 2, looking toward the right.

Fig. 6 is an enlarged sectional view on line 6—6 in Fig. 2, looking in the direction of the arrows.

Fig. 6a is an enlarged sectional view on line X—X in Fig. 2, looking toward the left.

Fig. 6b is an enlarged sectional view on the said line X—X in Fig. 2, looking toward the right.

Fig. 7 is an enlarged sectional view on line 7—7 in Fig. 2, looking in the direction of the arrows.

Fig. 7a is an enlarged sectional view on line Y—Y in Fig. 2, looking toward the left.

Fig. 7b is an enlarged sectional view on the said line Y—Y in Fig. 2, looking toward the right.

Fig. 8 is an enlarged sectional view on line 8—8 in Fig. 2, looking in the direction of the arrows.

Fig. 8a is an enlarged sectional view on line Z—Z in Fig. 2, looking toward the left.

Fig. 8b is an enlarged sectional view on the said line Z—Z in Fig. 2, looking toward the right.

With respect to the drawings and the numerals of reference thereon, 10 and 11 represent sheet metal members adapted to constitute the longitudinal or side bars of an automotive vehicle frame, 12, 13, 14, 15 and 16 designate sheet metal members adapted to constitute the transverse or cross bars of said automotive vehicle frame, and 17 indicates, generally, the automotive vehicle frame resulting from assembly and connection with each other, in a manner to be fully set forth, of the said longitudinal or side bars 10 and 11, and the said transverse or cross bars 12, 13, 14, 15 and 16, respectively.

As disclosed, each longitudinal or side member 10, 11 is of channel form, and the spaced apart upper and lower flanges, denoted 18 and 19, of the different longitudinal or side members are disposed toward each other.

The transverse or cross member 12 at the rear of the frame, is of shallow channel form, the body 20 thereof being relatively wide, and the downwardly extending flanges 21 of said member 12 being relatively narrow.

The transverse or cross member 13, next adjacent the member 12 at the rear, is also of channel form, the body 22 thereof having slightly less width than the downwardly extending flanges 23 of said member 13.

The transverse or cross member 14, next adjacent the member 13 and forwardly of the center of the frame, is likewise of channel form, the body 24 thereof having slightly greater width than the rearwardly extending flanges 25 of said member 14.

The transverse or cross member 15, next adjacent the member 14 and not far from the front of the frame, is generally, of Z form, the vertically disposed body 26 thereof being of somewhat greater width than the upper and lower horizontal flanges 27 of said member 15. One of the said flanges 27, the upper one as shown, extends forwardly of the frame, and the other flange 27, the lower one as shown, extends rearwardly.

The transverse or cross member 16, at the front of the frame, is of tubular form, the said member 16 being circular in cross-section, as indicated at 28.

The upper flange 18 of each longitudinal or side member 10, 11 includes an inwardly protruding extension 29, of length and thickness approximately equal to the length and thickness of an outwardly disposed extension 30 upon the adjacent end of the body 20 of the member 12, adapted to be placed in aligning and registering relation to the said extensions 30 and butt-welded thereto.

The upper flange 18 of each longitudinal or side member 10, 11 also includes an inwardly protruding extension 31, of length and thickness approximately equal to the length and thickness of the adjacent end portion 32 of the body 22 of the member 13, adapted to be placed in aligning and registering relation to the said end portions 32 and butt-welded thereto, and the lower flange 19 of each longitudinal or side member 10, 11 includes inwardly protruding extensions 33, of length and thickness approximately equal to the length and thickness of outwardly projecting extensions 34 upon the adjacent end of the flanges 23 adapted to align and register with and be butt-welded to the said extensions 34 when the extension 31 of the corresponding member 10 or 11 is in aligning and registering relation to be butt-welded to the corresponding end portion 32 of the body 22. As disclosed, the extensions 34 are perpendicular to the flanges 23 and extend outwardly from said flanges and away from each other.

The upper flange 18 of each longitudinal or side member 10, 11 also includes an inwardly protruding extension 35, of length and thickness approximately equal to the length and thickness of the adjacent end portion 36 of the upper flange 25 of the member 14, adapted to be placed in aligning and registering relation to the said end portions 36 and butt-welded thereto, and the lower flange 19 of each longitudinal or side member 10, 11 also includes an inwardly protruding extension 37, of length and thickness approximately equal to the length and thickness of the adjacent end portion 36 of the lower flange 25 of the member 14, adapted to align and register with and be butt-welded to the end portions 36 of the said lower flanges 25 when the extension 35 of the corresponding member 10 or 11 is in aligning and registering relation to be butt-welded to the corresponding end portion 36 of the upper flange 25.

The upper flange 18 of each longitudinal or side member 10, 11 also includes an inwardly protruding extension 38, of length and thickness approximately equal to the length and thickness of the adjacent end portion 39 of the upper flange 27 of the member 15, adapted to be placed in aligning and registering relation to the said end portions 39 and butt-welded thereto, and the lower flange 19 of each longitudinal or side member 10, 11 also includes an inwardly protruding extension 40, of length and thickness approximately equal to the length and thickness of the adjacent end portion 39 of the lower flange 27 of the member 15, adapted to align and register with and be butt-welded to the end portions 39 of the said lower flanges 27 when the extension 38 of the corresponding member 10 or 11 is in aligning and registering relation to be butt-welded to the corresponding end portion 39 of the upper flange 27.

The upper flange 18 of each longitudinal or side member 10, 11 also includes an inwardly protruding extension 41, of length and thickness approximately equal to the length and thickness of an upper extension 42 upon the adjacent end of the member 16, adapted to be placed in aligning and registering relation to the said upper extensions 42 and butt-welded thereto, and the lower flange 19 of each longitudinal or side member 10, 11 also includes an inwardly protruding extension 43, of length and thickness approximately equal to the length and thickness of a lower extension 42 upon the adjacent end of the member 16, adapted to align and register with and be butt-welded to the said lower extensions 42 when the extension 41 of the corresponding member 10 or 11 is in aligning and registering relation to be butt-welded to the corresponding upper extension 42 of the member 16.

The width of each of the extensions upon the flanges 18 and 19 of the members 10 and 11 somewhat exceeds the thickness of the said members 10 and 11, as disclosed, and the outer edge of each of the extensions upon the frame longitudinal or side members desirably terminates at about the location illustrated in the drawings.

As shown, the finished frame tapers from rear toward front thereof, although the arrangement could be different.

It will be seen that each extension of the frame longitudinal or side members is of approximately the same cross-sectional area as the part of the transverse or cross member to which it is to be butt-welded, in order that the various parts of the frame members to be joined together can be equally heated and readily and properly united by butt-welding.

Each part of the various transverse or cross members of the frame is placed in registering and aligning relation with the extension of the longitudinal or side member to which it is to be united, welding current is applied to the joint, and the said parts of the transverse or cross members and the said extensions of the longitudinal or side members are pressed together, all in any ordinary or preferred manner, until by the fusion of the metal of said parts and extensions, these become integrally connected. As is well known, the butt-welding operation as thus accomplished consumes a portion of the metal of each of the parts and extensions joined, and the longitudinal or side members and the transverse or cross members as prepared take this feature into consideration. See Fig. 3 wherein 44 designates a strip upon each of the extensions 35 and the end portions 36, consumed at the joint in the weld. Also compare the disclosure of Fig. 1 with that of Fig. 2, and note that each part of the transverse or cross members to be attached to a longitudinal or side member and each extension of the longitudinal or side members to be attached to a transverse or cross member, in Fig. 1 includes a strip which is the equivalent of the said strips designated 44, and consumed in the joints at the welds in Fig. 2.

In practice, each of the transverse or cross members 12, 13, 14, 15 and 16 can be separately united to one of the longitudinal or side members 10 or 11, and the other longitudinal or side member 11 or 10 can be joined to all of the opposite ends of the said transverse or cross members simultaneously. I prefer, however, to retain all of the transverse or cross members in stationary position and cause one longitudinal or side member at a time, or both of said longitudinal or side members concurrently, to be united to all of the adjacent ends of the transverse or cross members simultaneously. See Figs. 1, 2, and 3. Naturally, in the preparation of the different longitudinal or side members and the different transverse or cross members for producing the automotive vehicle frame, the various elements as mentioned and adapted to constitute the said frame will be so constructed and dimensioned that at the finish of the butt-welding operations as described, a frame of the exact and predetermined unitary structure and size as desired will exist, as will be understood.

Attention is called to the fact that the construction and configuration of the longitudinal or side members and of the transverse or cross members of an automotive vehicle frame made in accordance with the principles of my invention can obviously be varied throughout wide limits, the longitudinal or side members and the transverse or cross members as disclosed in the drawings and as specifically described being merely illustrative of several of the various constructions and arrangements of frame members which I consider practical.

Having thus fully described my invention, what I claim and desire to secure by Letters Patent of the United States, is:

1. The method of making a vehicle frame consisting of spaced apart, longitudinal sheet metal members, and spaced apart, transverse sheet metal members, which consists in providing a plurality of transverse sheet metal frame members and a pair of longitudinal sheet metal frame members, retaining all of said transverse members in stationary position, and electric resistance butt-welding both of said longitudinal members to the opposite ends of all of said transverse members simultaneously.

2. The method of making a vehicle frame consisting of spaced apart, longitudinal sheet metal members, and spaced apart, transverse sheet metal members spanning the distance between the said longitudinal sheet metal members, which consists in providing a plurality of transverse sheet metal frame members and a pair of longitudinal sheet metal frame members having opposed extensions including a set of opposed extensions for each transverse member adapted to align and register with the opposite end portions of each of the said transverse members, each extension having approximately the same cross-sectional area as the corresponding transverse member end portion, and causing the extensions of both of said longitudinal members to be concurrently and integrally united by butt-welding to all of the opposite end portions of said transverse members simultaneously.

3. The method of making a vehicle frame consisting of spaced apart, longitudinal sheet metal members, and spaced apart, transverse sheet metal members spanning the distance between the said longitudinal sheet metal members, which consists in providing a plurality of transverse sheet metal frame members and a pair of longitudinal sheet metal frame members having opposed extensions including a set of opposed extensions for each transverse member adapted to align and register with the opposite end portions of each of the said transverse members, each extension having approximately the same cross-sectional area as the corresponding transverse member end portion, retaining all of the transverse members in stationary position with the corresponding end portions of each of the said transverse members in aligning and registering relation to the extensions of said longitudinal members, applying welding current to the joints between the said transverse members and said longitudinal members, and pressing said longitudinal members toward each other and the stationary transverse members therebetween simultaneously until the joints between the ends of the transverse members and the respective extensions on said longitudinal members become welded.

4. A method of making a vehicle frame having spaced apart longitudinal sheet metal members and spaced apart transverse metal members connecting said longitudinal members which comprises providing a plurality of transverse frame members and a pair of longitudinal sheet metal frame members, retaining all of said transverse members in spaced relatively stationary position, bringing said longitudinal members in welding relation to the ends of said transverse members, applying a welding current between said longitudinal members and said transverse members to simultaneously bring the adjacent surfaces thereof to welding temperature, and relatively moving said longitudinal members toward each other to weld the same to the transverse members and thereby provide an integral frame.

5. The method of making an automobile frame of accurate dimensions from side bars and cross members, that comprises the steps of disposing a plurality of cross members in predetermined spaced relation, disposing a pair of side bars in contact with the ends of the cross members in predetermined longitudinal positions, passing electric currents through the points of contact of the side bars with the cross members to heat the contact points to welding temperature, and advancing the side bars simultaneously to a predetermined relative transverse position to weld them to the cross members and to form a frame of accurate dimensions.

In testimony whereof, I have signed my name at Milwaukee, this 8th day of June, 1928.

WALTER E. RICHTER.